United States Patent
Moratz

(10) Patent No.: US 9,657,778 B1
(45) Date of Patent: May 23, 2017

(54) CONVERTIBLE CAGE FOR BALL BEARING AND ASSOCIATED BEARING

(71) Applicant: Schaeffler Technologies AG & Co. KG, Herzogenaurach (DE)

(72) Inventor: William Moratz, Gardiner, NY (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/942,232

(22) Filed: Nov. 16, 2015

(51) Int. Cl.
*F16C 33/38* (2006.01)
*F16C 19/06* (2006.01)

(52) U.S. Cl.
CPC .............. *F16C 33/38* (2013.01); *F16C 19/06* (2013.01)

(58) Field of Classification Search
CPC .............. F16C 33/3862; F16C 33/3868; F16C 33/3875; F16C 33/412; F16C 33/414; F16C 33/416
See application file for complete search history.

(56) References Cited

U.S. PATENT DOCUMENTS

| 463,834 | A | * | 11/1891 | Howard | F16C 33/3818 384/534 |
| 3,471,208 | A | * | 10/1969 | Vannest | F16C 33/3868 384/530 |
| 2011/0069920 | A1 | * | 3/2011 | Aida | F16C 33/3875 384/572 |

FOREIGN PATENT DOCUMENTS

GB 191022260 A * 0/1911 .......... F16C 33/3868

* cited by examiner

*Primary Examiner* — Phillip A Johnson
(74) *Attorney, Agent, or Firm* — Volpe and Koenig, P.C.

(57) ABSTRACT

A convertible bearing cage is provided including a first cage part having a first rim with a plurality of first projections extending axially therefrom that form open, snap-in pockets for receiving bearing balls. Connection holes are located in the projections. A second cage part having a second rim with a plurality of second projections extending axially therefrom that form partial pockets is also provided. The plurality of second projections are aligned with the first projections. A ring guide extends circumferentially around the second rim. The second cage part is connectable to the first cage part with the second plurality of projections contacting the first priority of projections using connection elements that engage in or through the connection holes to form closed pockets. The first cage part is used alone as an open pocket, ball guided cage, or connected to the second cage part as a closed pocket, ring guided cage.

13 Claims, 1 Drawing Sheet

CONVERTIBLE CAGE FOR BALL BEARING AND ASSOCIATED BEARING

FIELD OF INVENTION

The present invention relates to a rolling bearing assembly, and is more particularly related to a cage suitable for use in different types of rolling bearing assemblies.

BACKGROUND

Bearing assemblies are used in a wide range of applications and come in a wide range of sizes and shapes, depending upon the particular loads and equipment configurations. Many bearing assemblies include cages which maintain the rolling elements spaced apart from one another so that the load is equally distributed between the inner and outer bearing rings. During rotation of the bearing, the cage maintains the spacing between the rolling elements. In some applications, a crown cage is provided into which rolling elements, such as bearing balls, are snapped into the open pockets formed between axially extending protrusions that extend from a rim that is adapted be located on one side of the rolling elements. These are suitable for use in connection with low speed bearings. Other bearing arrangements include cages with closed pockets which can be used in higher load or higher speed applications. These cages can be formed in one piece or, for larger sized bearings, are often formed in two crown shaped pieces that are then joined together along a center line of the rolling elements to provide a closed cage configuration. A further option in connection with the closed cage configuration is to provide a ring guide located on the cage rim which can contact an inner surface of the outer ring in order to provide a guide for the cage as it rotates. This is in contrast to ball guided cages which are guided by the contact with the rolling elements, such as bearing balls.

In many applications, the bearing ball size and spacing is the same, although the inner and outer rings for the bearing can be different. For example, a regular ball bearing versus a deep groove ball bearing. Further, depending upon the application an open pocket, ball guided cage or a closed pocket, ring guided cage is needed in order to maintain the same spacing for the same diameter bearing balls. However, due to the different cage configurations, different parts are required to be manufactured and inventoried.

Further, the need sometimes arises in certain applications to change out bearings that previously had an open pocket, ball guided cage to a closed pocket, ring guided cage when equipment speeds change from relatively low speed to higher speed operation on a relatively permanent basis.

It would be desirable to provide the same cage part for use in multiple different applications, to the extent possible, in order to reduce both costs and inventory requirements. It would also be desirable to allow for an existing bearing to be changed from an open pocket, ball guided cage to a closed pocket ring guided cage without the need for replacing the entire bearing.

SUMMARY

A convertible bearing cage is provided. The cage includes a first cage part having a first rim with a plurality of first projections extending axially therefrom that form open, snap-in pockets for receiving bearing balls, and connection holes are located in the projections. A second cage part having a second rim with a plurality of second projections extending axially therefrom that form partial pockets is also provided. The plurality of second projections are aligned with the first projections. A ring guide extends circumferentially around the second rim. The second cage part is connectable to the first cage part with the second plurality of projections contacting the first priority of projections using connection elements that engage in or through the connection holes to form closed pockets. This allows the first cage part to be used as an open pocket, ball guided cage, without the second cage part. Alternatively, the first cage part can be used as part of a closed pocket, ring guided cage when it is connected with the second cage part. This allows the first cage part to be maintained in inventory and used in connection with ball bearings having open, snap-in pockets, typically for lower speed applications. To the extent that a similarly sized bearing is required including the same sized bearing balls and spacing, the second cage part can be connected to the first cage part in order to form a closed pocket, ring guided cage, typically used in higher speed applications.

Preferably, the second projections also include holes and the connection elements are mechanical fasteners that extend through the first and second connection holes in at least some of the aligned pairs of the first and second projections. Alternatively, the holes could in the first or second cage parts could be threaded and threaded fasteners inserted through the other of the first and second cage parts. In one embodiment, the mechanical fasteners are aluminum rivets, which require only a low force in order to deform the rivet head which is particularly useful for first and second cage parts made from polymeric materials, such as phenolic resin.

In one embodiment, the first projections include concave ball engagement surfaces that are complementary to the bearing balls that are insertable therein. This holds the bearing balls in position in the open, snap-in pockets. In this case, the first projections preferably extend over a center line of the bearing balls that are insertable therein.

In connection with the closed pocket, ring guided cage, the ring guide on the second cage part is preferably formed as a cylindrical surface.

In another aspect, a bearing assembly is provided including an inner ring with an inner race and an outer ring with an outer race. Bearing balls are located between the inner ring and the outer ring. A convertible bearing cage is provided including a first cage part as discussed above with the plurality of first projections extending axially therefrom that form the open, snap-in pockets in which the bearing balls are located. Connection holes are located in the projections. Here, the cage is guided on the bearing balls.

To the extent that a closed pocket, ring guided cage is desired, a second cage part is provided as discussed above having the second rim with the plurality of second projections extending axially therefrom that form partial pockets. These second projections are aligned with the first projections. The ring guide extends circumferentially around the second rim. The second projections are aligned with the first projections. The second cage part is connected to the first cage part with the second plurality projections contacting the first plurality projections using connection elements that engage in or through the connection holes in order to form the closed pockets. This forms a closed pocket, ring guided cage that is guided by the ring guide contacting an inner surface of the outer ring.

This arrangement allows the first cage part to be kept in inventory and used either by itself as an open pocket, a ball guided cage, or, once connected with the second cage part, as a closed pocket, ring guided cage. Further, this allows retrofitting of existing bearings originally provided with only the first cage part in order to convert them to a closed pocket, ring guided cage if the bearing operation is to change to high speeds on a more or less permanent basis, allowing conversion without replacement of the entire existing bearing, which can save time and costs.

This arrangement would allow conversion in the event that such a bearing is already in use in one application which subsequently changes where otherwise, replacement of the entire bearing would be required.

Additional embodiments are described below and in the claims.

BRIEF DESCRIPTION OF THE DRAWINGS

The foregoing Summary and the following detailed description will be better understood when read in conjunction with the appended drawings, which illustrates a preferred embodiment of the invention. In the drawings.

DETAILED DESCRIPTION OF THE PREFERRED EMBODIMENTS

Figure 1:
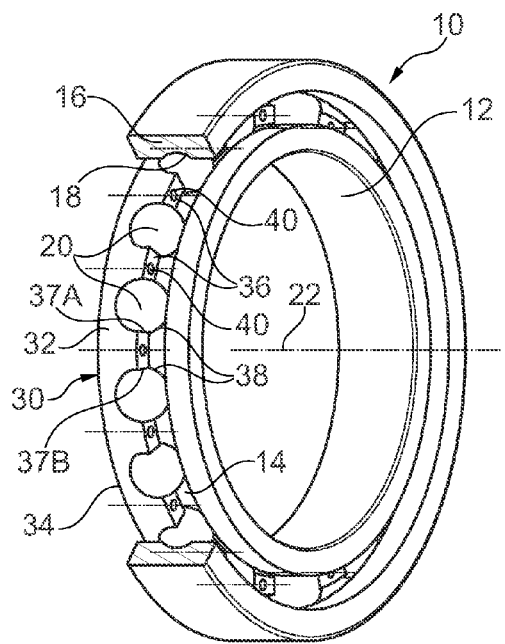
FIG. 1 is a perspective view of a bearing assembly according to an embodiment of the invention having a first cage part.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 2:
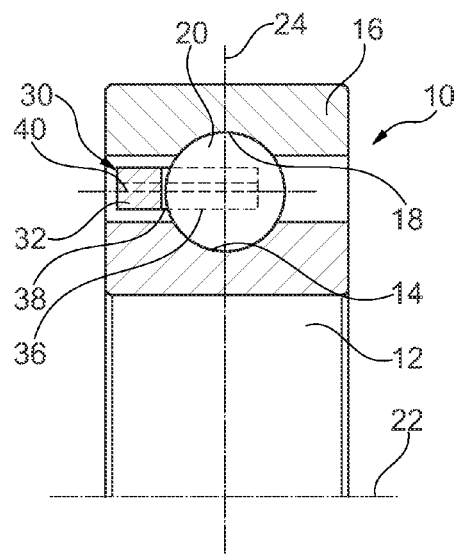
FIG. 2 is a cross-sectional view through the bearing of FIG. 1.

Referring to FIGS. 1 and 2, a bearing assembly 10 is shown. The bearing assembly 10 includes an inner ring 12 with an inner race 14 as well as an outer ring 16 with an outer race 18. Bearing balls 20 are located between the inner ring 12 and the outer ring 14. As shown in FIGS. 1 and 2, the bearing assembly 10 has an axis 22 as well as a center line 24 that extends through the axial centers of the bearing balls 20. A convertible bearing cage 30 is provided having a first cage part 32 with a rim 34. A plurality of first projections 36 extend axially from the rim 34 and form open, snap-in pockets 38 in which the bearing balls 20 are located. Connection holes 40 are preferably provided that are located in the projections 36. The cage 30 is guided on the bearing balls 20. Preferably, the first projections 36 include concave ball engaging surfaces 37a, 37b that are complementary to the bearing balls 20 located therein. This retains the bearing balls 20 in location after they are snapped into the first cage part 32. Here, the first projections 36 extend over the center line 24 of the bearing balls located therein.

This arrangement provides ball controlled cage guidance where the cage part 32 is maintained in position by its engagement with the bearing balls 20. Cage guidance could also be provided by contact with an outer surface of the inner ring 12. The cage 30 can be machined from bronze, a phenolic or other suitable metal or polymeric material, and can alternatively be molded or formed using other suitable techniques. This open type of cage 30 formed by the first cage part 32 is useful in lower speed operations.

Figure 3:
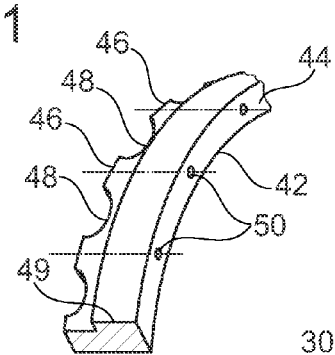
FIG. 3 is a partial perspective view of a second cage part in accordance with an embodiment of the invention.
Figure 4:
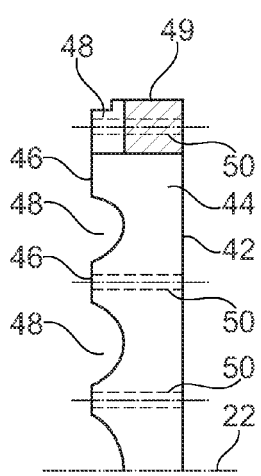
FIG. 4 is a cross-sectional view through the second cage part shown in FIG. 3.
Figure 5:
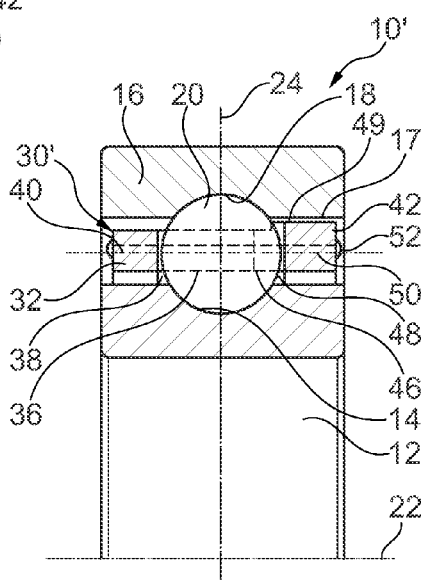
FIG. 5 is a partial cross-sectional view through a bearing assembly according to an embodiment of the invention with the second cage part installed on the first cage part.

In order to provide further possibilities with respect to using the first cage part 32 in a second application, or converting the bearing 10 from a low speed operation to a high speed operating bearing 10' as shown in FIG. 5, the bearing assembly 10' can initially be provided as a closed pocket, ring guided cage 30' or the bearing assembly 10 with the open, snap-in pockets 38 can be converted to the bearing assembly 10' with a closed pocket, ring guided cage 30' for higher speed operation by providing a second cage part 42 as shown in detail in FIGS. 3-5. The second cage part 42, shown partially in FIGS. 3-5 but also formed as a complete ring, has a second rim 44 with a plurality of second projections 46 extending axially therefrom that form partial pockets 48. The plurality of second projections 46 are aligned with the first projections 36. A ring guide 49 extends circumferentially around the second rim 44. Preferably, the ring guide 49 is formed as a cylindrical surface.

The second cage part 42 is connected to the first cage part 32 as shown in detail in FIG. 5, with the second plurality of projections 46 contacting the first plurality of projections 36, using connection elements 52 that engage in or through the connection holes 40 in the first cage part 32 to form closed pockets. This converts the convertible bearing cage 30 originally including only the first cage part 32 to a closed pocket, ring guided cage 30' guided by the ring guide 49 contacting the inner surface 17 of the outer ring 16 as shown in FIG. 5. The second cage part 42 is preferably also formed with polymeric material, such as phenolic, PEEK, or Teflon, or can also be formed of bronze or any other suitable metallic material. Preferably, second connection holes 50 are located in the second projections 48, and the connection elements 52 are mechanical fasteners that extend at least partially through the first and second connection holes 40, 50, in at least some of the aligned pairs of the first and second projections 36, 46. The mechanical fasteners can be screws that extend through the second connection holes 50 and engage in the first connection holes 40, which can be threaded. Alternatively, the screws can be self-tapping, self-locking screws. Alternatively, the mechanical fasteners can be aluminum rivets which require only a low amount of force in order to form the rivet heads, which is particularly advantageous in terms of reliability and for use in connection with polymeric first and second cage parts 32, 42.

The convertible bearing cage 30' including the first cage part 32 and the second cage part 42 can be provided when the bearing assembly 10' is initially assembled. Since the first cage part 32 can also be used as an open pocket, ball guided cage 30, this allows the first cage part 32 to have multiple uses. This allows for reduced inventory as well as increased design flexibility for applications using bearings including the convertible bearing cage 30, 30'. Additionally, to the extent that the equipment is later to be converted for higher speed operation, the second cage part 42 can be provided as an auxiliary piece for conversion of the existing bearing 10 with the open cage formed by the first cage part 32 into a closed pocket, ring guided cage 30' by installing the second cage part 42. The second cage parts 42 could be kept in inventory for customers to allow them to do a later conversion and also provides increased flexibility in production for making bearings to order.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A convertible bearing cage, comprising
a first cage part having a first rim with a plurality of first projections extending axially therefrom that form open, snap-in pockets for receiving bearing balls, and connection holes located in the first projections;
a second cage part having a second rim with a plurality of second projections extending axially therefrom that form partial pockets, the plurality of second projections are aligned with first projections, and a ring guide extends circumferentially around the second rim;
wherein the second cage part is connectable to the first cage part with the second plurality of projections contacting the first plurality of projections using connection elements that engage in or through the connection holes to form closed pockets, such that the first cage part is adapted for use as an open pocket, ball guided cage without the second cage part and as a closed pocket, ring guided cage with the connected second cage part.

2. The cage of claim 1, wherein second connection holes are located in the second projections, and the connection elements are mechanical fasteners that extend through the first and second connection holes in at least some aligned pairs of the first and second projections.

3. The cage of claim 2, wherein the mechanical fasteners are aluminum rivets.

4. The cage of claim 1, wherein the first projections include concave ball engaging surfaces that are complementary to bearing balls that are insertable therein.

5. The cage of claim 1, wherein the first projections extend over a centerline of bearing balls that are insertable therein.

6. The cage of claim 1, wherein the ring guide is formed as a cylindrical surface.

7. A bearing assembly, comprising:
an inner ring with an inner race;
an outer ring with an outer race;
bearing balls located between the inner ring and the outer ring;
a convertible bearing cage comprising a first cage part having a first rim with a plurality of first projections extending axially therefrom that form open, snap-in pockets in which the bearing balls are located, and connection holes located in the first projections, the cage being guided on the bearing balls.

8. The bearing assembly of claim 7, further comprising a second cage part having a second rim with a plurality of second projections extending axially therefrom that form partial pockets, the plurality of second projections are aligned with first projections, and a ring guide extends circumferentially around the second rim;
wherein the second cage part is connected to the first cage part with the second plurality of projections contacting the first plurality of projections using connection elements that engage in or through the connection holes in order to form closed pockets, forming a closed pocket, ring guided cage guided by the ring guide contacting an inner surface of the outer ring.

9. The bearing assembly of claim 8, wherein second connection holes are located in the second projections, and the connection elements are mechanical fasteners that extend through the first and second connection holes in at least some aligned pairs of the first and second projections.

10. The bearing assembly of claim 9, wherein the mechanical fasteners are aluminum rivets.

11. The bearing assembly of claim 8, wherein the ring guide is formed as a cylindrical surface.

12. The bearing assembly of claim 7, wherein the first projections include concave ball engaging surfaces that are complementary to bearing balls located therein.

13. The bearing assembly of claim 7, wherein the first projections extend over a centerline of bearing balls located therein.

* * * * *